(12) United States Patent  
Pande et al.

(10) Patent No.: US 8,244,271 B2  
(45) Date of Patent: Aug. 14, 2012

(54) DISTRIBUTED DATA COLLECTION OF SATELLITE DATA

(75) Inventors: Ashutosh Pande, San Jose, CA (US); Steve Chang, San Jose, CA (US); Lionel Garin, Palo Alto, CA (US); Qiyue John Zhang, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 372 days.

(21) Appl. No.: 10/969,157

(22) Filed: Oct. 20, 2004

(65) Prior Publication Data

US 2005/0130590 A1    Jun. 16, 2005

Related U.S. Application Data

(63) Continuation-in-part of application No. 10/874,775, filed on Jun. 23, 2004, which is a continuation-in-part of application No. 10/154,138, filed on May 21, 2002.

(60) Provisional application No. 60/292,774, filed on May 21, 2001.

(51) Int. Cl.  
*H04W 24/00* (2009.01)

(52) U.S. Cl. .............. 455/456.1; 455/12.1; 455/456.2; 455/456.5; 455/456.6; 342/357

(58) Field of Classification Search .............. 455/456, 455/456.1, 12.1, 456.2, 456.5, 456.6; 342/357  
See application file for complete search history.

(56) References Cited

U.S. PATENT DOCUMENTS

| | | | |
|---|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,202,829 A | 4/1993 | Geier |
| 5,225,842 A | 7/1993 | Brown et al. |
| 5,293,170 A | 3/1994 | Lorenz et al. |

(Continued)

FOREIGN PATENT DOCUMENTS

EP    0511741    11/1992

(Continued)

*Primary Examiner* — Justin Lee  
(74) *Attorney, Agent, or Firm* — RatnerPrestia

(57) ABSTRACT

A shuttle message that is passed between GPS enabled devices that is processed at either a bit level or word level with data that the GPS enable device has already gathered and augmenting the positioning data stored at GPS enabled devices by retrieving data contained in the shuttle message. The shuttle message is then passed with any updated information from a GPS enabled device to one or more other devices such as a mobile station.

25 Claims, 14 Drawing Sheets

U.S. PATENT DOCUMENTS

| | | | |
|---|---|---|---|
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,536 A | 9/1994 | Meehan | |
| 5,379,224 A | 1/1995 | Brown et al. | |
| 5,402,347 A | 3/1995 | McBurney et al. | |
| 5,416,712 A | 5/1995 | Geier et al. | |
| 5,420,593 A | 5/1995 | Niles | |
| 5,440,313 A | 8/1995 | Osterdock et al. | |
| 5,450,344 A | 9/1995 | Woo et al. | |
| 5,504,684 A | 4/1996 | Lau et al. | |
| 5,592,173 A | 1/1997 | Lau et al. | |
| 5,625,668 A | 4/1997 | Loomis et al. | |
| 5,663,734 A | 9/1997 | Krasner | |
| 5,663,735 A | 9/1997 | Eshenbach | |
| 5,697,051 A | 12/1997 | Fawcett | |
| 5,781,156 A | 7/1998 | Krasner | |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,578 A | 5/1999 | Pon et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A | 11/1999 | Watters et al. | |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,041,222 A | 3/2000 | Horton et al. | |
| 6,047,017 A | 4/2000 | Cahn et al. | |
| 6,052,081 A | 4/2000 | Krasner | |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,157,621 A * | 12/2000 | Brown et al. | 370/310 |
| 6,185,427 B1 | 2/2001 | Krasner | |
| 6,192,247 B1 | 2/2001 | Dillon et al. | |
| 6,208,290 B1 | 3/2001 | Krasner | |
| 6,208,291 B1 | 3/2001 | Krasner | |
| 6,215,441 B1 | 4/2001 | Moeglein | |
| 6,215,442 B1 | 4/2001 | Sheynblat | |
| 6,236,354 B1 | 5/2001 | Krasner | |
| 6,239,742 B1 | 5/2001 | Krasner | |
| 6,259,399 B1 | 7/2001 | Krasner | |
| 6,272,430 B1 | 8/2001 | Krasner | |
| 6,289,041 B1 | 9/2001 | Krasner | |
| 6,307,504 B1 | 10/2001 | Sheynblat | |
| 6,313,786 B1 | 11/2001 | Sheynblat | |
| 6,314,308 B1 | 11/2001 | Sheynblat | |
| 6,377,209 B1 | 4/2002 | Krasner | |
| 6,408,196 B2 | 6/2002 | Sheynblat | |
| 6,411,254 B1 | 6/2002 | Moeglein | |
| 6,411,892 B1 | 6/2002 | Van Diggelen | |
| 6,417,801 B1 | 7/2002 | Van Diggelen | |
| 6,421,002 B2 | 7/2002 | Krasner | |
| 6,429,814 B1 | 8/2002 | Van Diggelen et al. | |
| 6,433,731 B1 | 8/2002 | Sheynblat | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,821 B2 | 4/2003 | Krasner | |
| 6,583,757 B2 | 6/2003 | Krasner | |
| 6,597,311 B2 | 7/2003 | Sheynblat | |
| 6,603,978 B1 | 8/2003 | Carlsson et al. | |
| 6,675,011 B1 | 1/2004 | Kita | |
| 6,937,865 B1 | 8/2005 | Bloebaum et al. | |
| 6,937,866 B2 | 8/2005 | Duffett-Smith et al. | |
| 2001/0039192 A1 | 11/2001 | Osterling | |
| 2002/0004398 A1 | 1/2002 | Ogino et al. | |
| 2002/0075182 A1 | 6/2002 | Sheynblat | |
| 2002/0086684 A1 | 7/2002 | Pande et al. | |
| 2002/0098849 A1 * | 7/2002 | Bloebaum et al. | 455/456 |
| 2002/0123352 A1 | 9/2002 | Vayanos et al. | |
| 2002/0168985 A1 * | 11/2002 | Zhao et al. | 455/456 |
| 2002/0173421 A1 | 11/2002 | Turetzky et al. | |
| 2004/0008138 A1 | 1/2004 | Hockley, Jr. et al. | |
| 2004/0027283 A1 * | 2/2004 | Dooley et al. | 342/458 |
| 2004/0183724 A1 | 9/2004 | Sheynblat | |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO90/11652 | 10/1990 |
| WO | WO01/78260 | 10/2001 |

* cited by examiner

DISTRIBUTED DATA COLLECTION OF SATELLITE DATA

RELATED APPLICATIONS

This application is a continuation-in-part of and claims priority to U.S. patent application Ser. No. 10/874,775, filed on Jun. 23, 2004, entitled "VIRTUAL SATELLITE POSITION SYSTEM SERVER" by Ashutosh Pande et al. that is a continuation-in-part of and claims priority to U.S. patent application Ser. No. 10/154,138, filed on May 21, 2002, entitled "METHOD FOR SYNCHRONIZING A RADIO NETWORK USING END USER RADIO TERMINALS," by Gregory B. Turetzky et al, that claims priority under 35 U.S.C. §119(e) of U.S. Provisional Patent Application No. 60/292,774, filed May 21, 2001, entitled "METHOD FOR SYNCHRONIZING A RADIO NETWORK USING END USER RADIO TERMINALS," by Gregory B. Turetzky, et al. Which are incorporated by reference herein.

BACKGROUND OF THE INVENTION

1. Field of the Invention

This invention relates generally to Satellite Positioning Systems and in particular to position data collection and dissemination with virtual satellite positioning system servers.

2. Related Art

A Satellite Positioning System (SATPS) such as the Global Positioning System (GPS) maintained by the United States Government is based on radio navigation. The GPS system is a satellite based navigation system having a network of 24 satellites, plus on orbit spares, orbiting 11,000 nautical miles above the Earth, in six evenly distributed orbits. Each GPS satellite orbits the Earth every twelve hours.

A prime function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the coarse acquisition code (C/A code). Every 20th cycle the code can change phase and is used to encode a 1500 bit long message, which contains "almanac" data for the other GPS satellites.

There are 32 PN codes designated by the GPS authority. Twenty-four of the PN codes belong to current GPS satellites in orbit and the 25th PN code is designated as not being assigned to any GPS satellite. The remaining PN codes are spare codes that may be used in new GPS satellites to replace old or failing units. A GPS receiver may, using the different PN sequences, search the signal spectrum looking for a match. If the GPS receiver finds a match, then it has identified the GPS satellite, which generated that signal.

Ground based GPS receivers use a variant of radio range measurement methodology, called trilateration, in order to determine the position of the ground based GPS receiver. The GPS position determination is different from the radio direction finding (RDF) technology of the past in that the radio beacons are no longer stationary they are satellites moving through space at a speed of about 1.8 miles per second as they orbit the earth. By, being space based, the GPS system can be used to establish the position of virtually any point on Earth using methods such as trilateration.

The trilateration method depends on the GPS receiving unit obtaining a time signal from the GPS satellites. By knowing the actual time and comparing it to the time that is received from the GPS satellites, the receiver can calculate the distance to the GPS satellite. If, for example, the GPS satellite is 12,000 miles from the receiver, then the receiver must be located somewhere on the location sphere defined by the radius of 12,000 miles from that GPS satellite. If the GPS receiver then ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite, whose location sphere will intersect one of the two possible location points, the precise position of the GPS receiver is determined to be the location point located on the Earth. The fourth GPS satellite is also used to resolve the clock error in the receiver. As a consequence, the exact time may also be determined because there is only one time offset that can account for the positions of all the GPS satellites. The trilateration method may yield positional accuracy on the order of 30 meters; however the accuracy of GPS position determination may be degraded due to signal strength and multipath reflections.

As many as 11 GPS satellites may be received by a GPS receiver at one time. In certain environments such as a canyon some GPS satellites may be blocked out and the GPS position determining system may depend for position information on GPS satellites that have weaker signal strengths, such as GPS satellites near the horizon. In other cases overhead foliage may reduce the signal strength that is received by the GPS receiver unit. In either case signal strength may be reduced or totally blocked. In such case aiding information may be used to aid in location determination.

There are multiple ways of using radio spectrum to communicate. For example in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their messages one after another only transmitting during their allotted period. With TDMA, the frequency upon which each transmitter transmits may be a constant frequency or may be continuously changing (frequency hopping).

As previously mentioned, another way of allotting the radio spectrum to multiple users through the use of code division multiple access (CDMA) also known as spread spectrum. In CDMA all the users transmit on the same frequency band all of the time. Each user has a dedicated code that is used to separate that user's transmission from all others. This code is commonly referred to as a spreading code, because it spreads the information across the band. The code is also commonly referred to as a Pseudo Noise or PN code. In a CDMA transmission, each bit of transmitted data is replaced by that particular user's spreading code if the data to be transmitted is a "1", and is replaced by the inverse of the spreading, code if the data to be transmitted is "0".

To decode the transmission at the receiver unit it is necessary to "despread" the code. The despreading process takes the incoming signal and multiplies it by the spreading code chip by chip and sums the result. This process is commonly known as correlation, and it is commonly said that the signal is correlated with the PN code. The result of the despreading process is that the original data may be separated from all the other transmissions, and the original signal may be recovered. A property of the PN codes that are used in CDMA systems is that the presence of one spread spectrum code does not change the result of the decoding of another code. The property that one code does not interfere with the presence of another code is often referred to as orthogonality, and codes, which have this property are said to be orthogonal. The process of extracting data from a spread spectrum signal is commonly known by many terms such as correlating, decoding, and despreading. Those terms may be used interchangeably herein. The codes used by a spread spectrum system are commonly referred to by a variety of terms including, but not limited to, PN (Pseudo Noise) codes, PRC (Pseudo Random Codes), spreading code, despreading code, and orthogonal code. Those terms may also be used interchangeably herein.

It is because CDMA spreads the data across a broadcast spectrum larger than strictly necessary to transmit data that CDMA is often referred to as spread spectrum. Spread spectrum has a number of benefits. One benefit being that because the data transmitted is spread across the spectrum spread spectrum can tolerate interference better than some other protocols. Another benefit is that messages can be transmitted with low power and still be decoded and yet another benefit is that several signals can be received simultaneously with one receiver tuned on the same frequency.

The GPS system uses spread spectrum technology to convey its data to ground units. The use of spread spectrum is especially advantageous in satellite positioning systems. Spread spectrum technology enables GPS receiver units to operate on a single frequency, thus saving the additional electronics that would be needed to switch and tune other bands if multiple frequencies were used. Spread Spectrum also minimizes power consumption requirements of GPS receivers. GPS transmitters for example require 50 watts or less and tolerate substantial interference.

Although the GPS system is available widely, there are conditions that can degrade its performance or block the effectiveness of individual GPS satellite position system receiver units, such as GPS receivers. But while some GPS receivers are less effective in determining their location others may not be blocked and are able to determine their location.

A known approach improving a GPS receiver units ability to acquire the visible GPS satellites is to use aiding information such as a timing signal provided by a fixed terrestrial network or almanac and ephemeris data stored in a fixed network device. But, GPS receiver units may have problems receiving a signal from the terrestrial network as well as the GPS satellites. Further the implementation of fixed network solutions require expense equipment being purchased and maintained by network operators. Fixed network solutions are also susceptible to network outages and failures. Often the expansion of network solutions is limited to adding additional hardware to the network at considerable cost.

Previous approaches to increasing the ability of the GPS receiver unit to acquire GPS satellites and determine the location of the GPS receiver unit involved the GPS receiver unit being configured to receive aiding or assigning data from another network, such as a cellular network. But, such approaches are less then optimal due to the number of different apes of networks, cost of network infrastructure and problems inherent with outages that may occur within fixed networks.

Therefore, there is a need for methods and systems for improving the ability of GPS receiver units to determine their location that overcomes the disadvantages set forth above and others previously experienced.

SUMMARY

Systems consistent with the present invention provide a virtual satellite system server that may be located within a wireless device, GPS enabled wireless device, fixed network element, or accessed by a GPS enabled device. The virtual satellite system server may receive, store, and transmit aiding or assisting position data to GPS enabled devices that are unable to receive satellite positioning data from enough GPS satellites to determine a location of the GPS enabled devices or to aid in reducing the time for acquisition GPS satellites.

The virtual satellite system server may be implemented in a wireless device such as, for example, a mobile station. PDA, Bluetooth enabled device. The wireless device having a virtual satellite system server may provide aiding or other information to other virtual satellite system servers or fixed network based location servers. Wireless devices with or without a virtual satellite system server may also receive aiding or assisting information from the virtual satellite system server enabled device.

The virtual satellite system server may also implement a shuttle message that is passed between virtual satellite systems located in wireless devices such as mobile stations. The shuttle message collects SATPS data from each virtual satellite system enabled device. The shuttle message may collect SATPS data at a word level or a bit level. The timing of the assembled SATPS messages is also maintained. Another aspect of the shuttle message is the ability of non-virtual satellite system enabled wireless devices to receive the shuttle message and process the SATPS data contained in the shuttle message.

Other systems, methods, features and advantages of the invention will be or will become apparent to one with skill in the art upon examination of the following figures and detailed description. It is intended that all such additional systems methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 6 is a block diagram illustrating the network elements that are implemented in a virtual satellite system server of.

DETAILED DESCRIPTION

Unlike the known approaches previously discussed, a virtual satellite system server enables multiple satellite system servers to be deployed throughout a wireless network, for example a cellular network, Bluetooth network, and 802.11 wireless network. Unlike fixed network GPS reference receiver implementations, a virtual satellite system server enables network operators avoid having to implement expensive fixed GPS reference receivers throughout a network while increasing the reliability of network aiding of GPS enabled wireless devices.

Figure 1:
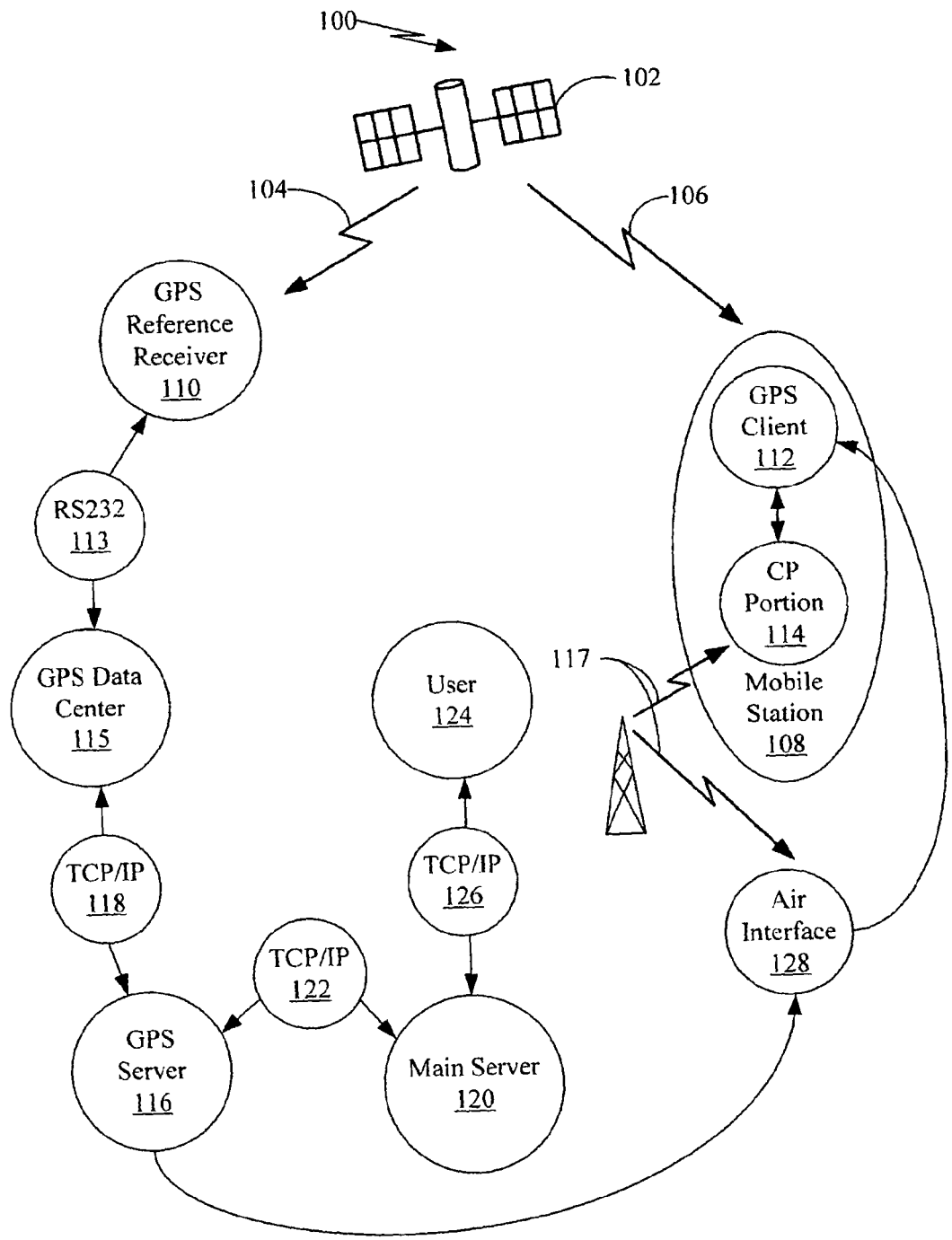
FIG. 1 illustrates a functional framework of satellite positioning system with a GPS Data Center.

Turning first to FIG. 1, a functional framework of a satellite position system 100 is shown. A plurality of satellites, one of which is shown 102, orbits the Earth in a constellation. An example of such a satellite constellation is the global positioning system (GPS) operated by the United States Government. The satellite 102 communicates 104 and 106 with a GPS enabled device such as Mobile Station 108 and a GPS reference receiver 110. The Mobile Station 108 may have a GPS client 112 and a communication part (call processing portion) 114 that is able to communicate with a communication and or data network 117 such as a cellular, Bluetooth, or 802.11 type wireless networks for example.

The GPS reference receiver 110 collects positioning data from a GPS receiver. The positioning data may include Ephemeris, Almanac, GPS time as well as other GPS data. The GPS reference receiver 110 may be in communication with a GPS Data Center 115 via a communication link such as RS232 link 113 that carries a protocol such as NMEA-108, RTCM104 and/or propriety message formats. The GPS Data Center 115 stores the positioning data received by the GPS reference receiver 110.

The RS232 link 113 may be transported over a telephone network (Public System Telephone Network) or a dedicated link such as a microwave communication link to give but a few examples. The GPS Data Center 115 may be in communication with a GPS server 116 over a TCP/IP connection 118.

The GPS server 116 may process positioning data received from the GPS reference receiver 110 and stored in the GPS Data Center 115 in order to determine a position. Further, the GPS server 116 may receive positioning data from other devices and determine a position by processing that positioning data. The GPS server 116 would then responds to the other device with the positioning result. The GPS server 116 may communicate with a main server 120 over a TCP/IP link 122.

The main server 120 may also communicate with a user 124 over another TCP/IP link 126. The main server 120 may receive geolocation request from the user 124 and provides a transport mechanism between the GPS server 116 and Mobile Station 108 and ultimately is able to return the geolocation information to the user 124. The user 124 may be an enhanced 911 (E911) server for a public safety answering point (PSAP) or other data services such as, for example providing locations of nearby restaurants, stores, or entertainment venues. The network elements 110, 115, 116, 120, and 124 are shown as separate network elements. In other implementations, the network elements may be combined or relocated within the network.

The GPS server 116 communicates using an over the air-interface 128 with the Mobile Station 108. The Mobile Station 108 may be an electrical device such as, but not limited to, a cellular telephone. Personal Computer (PC), handheld computer, Personal Digital Assistant (PDA), PCS devices and Bluetooth enabled devices. The air-interface 128 may be, for example, a cellular telecommunication standards such as IS-801, CDMA, TDMA, AMPs, NAMPs, iDEN, or other wireless communication standards such as Bluetooth or Wi-Fi to name but a few. The air-interface 128 may be transmitted over the infrastructure of the network 117, such as a network tower connected to base stations and transport networks such as PSTNs.

Figure 2:
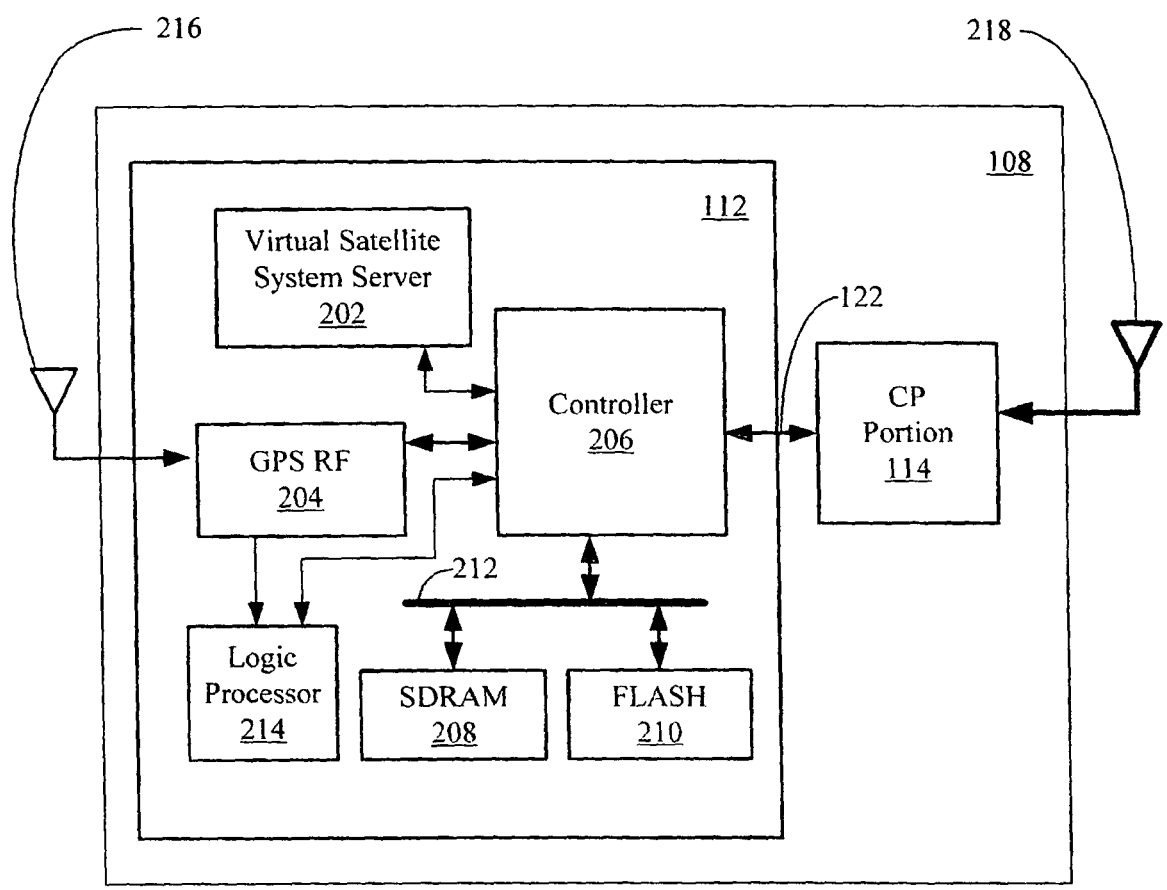
FIG. 2 is a block diagram of the Mobile Station of FIG. 1 with the GPS client that implements a virtual satellite system server.

Turning to FIG. 2, a block diagram of the Mobile Station 108 of FIG. 1 with the GPS client 112 that implements a virtual satellite system server (VSSS) 202 is illustrated. The GPS client 112 of the GPS enabled Mobile Station 108 has a GPS RF receiver 204, a controller 206, Synchronous Dynamic Random Access Memory (SDRAM) 208, flash memory 210, bus 212, and a logic processor block 214. The GPS RF receiver 204 receives the ranging signals (spread spectrum signals in the present implementation) via antenna 216. The controller 206 communicates with the virtual satellite system server 202, GPS RF receiver 204 and logic processor block 214.

The controller 206 executes a plurality of instructions stored in memory i.e. SDRAM 208 and flash memory 210, and acts on the results generated by the logic processor block 214 that processes the received spread spectrum signal. In an alternate implementation, the flash memory 210 may be read-only memory or other types of reprogrammable memory. The logic processor 214 malt be an analog-to-digital converter, match filter, correlators or a combination of the previous digital logic devices and other logic devices that aid in the processing of ranging signals, such as GPS spread spectrum signals. The controller 206 accesses the SDRAM 208 and flash memory 210 over bus 212.

The controller 206 mats also communicate with a host portion or CP portion 114 that may have a processor or controller in addition to the baseband processor and communicate with a wireless network via antenna 218. The processor or controller processes the I & Q measurements or digital RF from the data network 117 in the CP portion 114. The CP portion 114 may communicate with the controller 206 to receive the I and Q measurements. Or in an alternate implementation, the CP portion 114 may communicate with the GPS RF Receiver 204 and receive digital RF data. The processing portion of the CP portion 114 may have a memory with a plurality of instructions that the processor or controller execute to process the I & Q measurements.

If the controller 206 is not able to determine the location of the GPS enabled Mobile Station 108, then additional augmentation data or aiding data may be employed. Such data may be retrieved from a virtual satellite system server 202.

The virtual satellite system server 202 may reside locally in the GPS client 112 or in the CP portion 114. Data that may be contained in the virtual satellite system server 202 includes, but is not limited to almanac, ephemeris, GPS time, and DGPS data. The controller 206 may access aiding or assisting data contained in the virtual satellite system server 202 in order to determine the location of the GPS enabled Mobile Station 108.

Once the location of the GPS enabled Mobile Station 108 is determined, data such as the current almanac, ephemeris, GPS time, and DGPS data may be sent to the virtual satellite system server 202 that may reside in the GPS client 112. Further, periodic updates of the virtual satellite system server 202 may occur at predetermined intervals or upon the occurrence of an event. Examples of an event may include the reception of a token via a wireless network, reception of a broadcast message via a wireless network, upon an expiration of a timer, upon a new satellite signal being received by the GPS RF receiver 204.

The GPS client 112 of the GPS enabled Mobile Station 108 may have different modes, such as autonomous mode, network aided mode, and network centric mode that also may include communicating with virtual satellite system servers. In FIG. 2, the GPS client 112 functions as a sensor with the controller 206 generating raw data, such as I and Q measurement samples, for use by the CP portion 114. In this configuration, more power of the multifunction portion may be used to acquire weaker signals.

The GPS enabled Mobile Station 108 in an active mode may execute a plurality of instructions that operates the GPS client 112 as the sensor function. The sensor function results in the GPS client 112 receiving spread spectrum signals via antenna 216 at GPS RF receiver 204 and the generating raw pseudo range data by the controller 206. The raw pseudo range data is then sent to the CP portion 114 over communication path 122. The processing power of the CP portion 114 may then be used in con unction with the controller 206 to compute the latitude, longitude, altitude, time, heading, and velocity. The CP portion 114 may simply pass location data to the controller 206, act as a host for the GPS client, or preprocess/process location data. Thus, the added processing power of the CP portion 114 may be employed to aid in location determination. Another advantage of the sensor function is the ability to acquire weaker signals (as low as −162 dbm). The sensor function may have the greatest impact on a device incorporating a GPS client 112, but results in the ability to acquire weaker satellite signals and more quickly lock on to acquired signals.

Although the memory is depicted in FIG. 2 as SDRAM 208 or flash memory 210, one skilled in the art will appreciate that all or part of systems and methods consistent with the present invention may be stored on or read from other machine-readable media, for example, secondary storage devices such as hard disks, floppy disks, and CD-ROMs, a signal received from a network; or other forms of ROM or RAM either currently known or later developed. Further, although specific components of the GPS enabled Mobile Station 108 are described, one skilled in the art will appreciate that a positioning system suitable for use with methods, systems, and articles of manufacture consistent with the present invention may contain additional or different components. For example, the controller 206 may be a microprocessor, microcontroller, application specific integrated circuit ("ASIC"), discrete or a combination of other types of circuits acting as a central processing unit, a specially designed DSP that processes data in blocks of size other than multiples of eight bit.

The memory 208 may be RAM, DRAM, EEPROM, or any other type of read/writeable memory.

Figure 3:
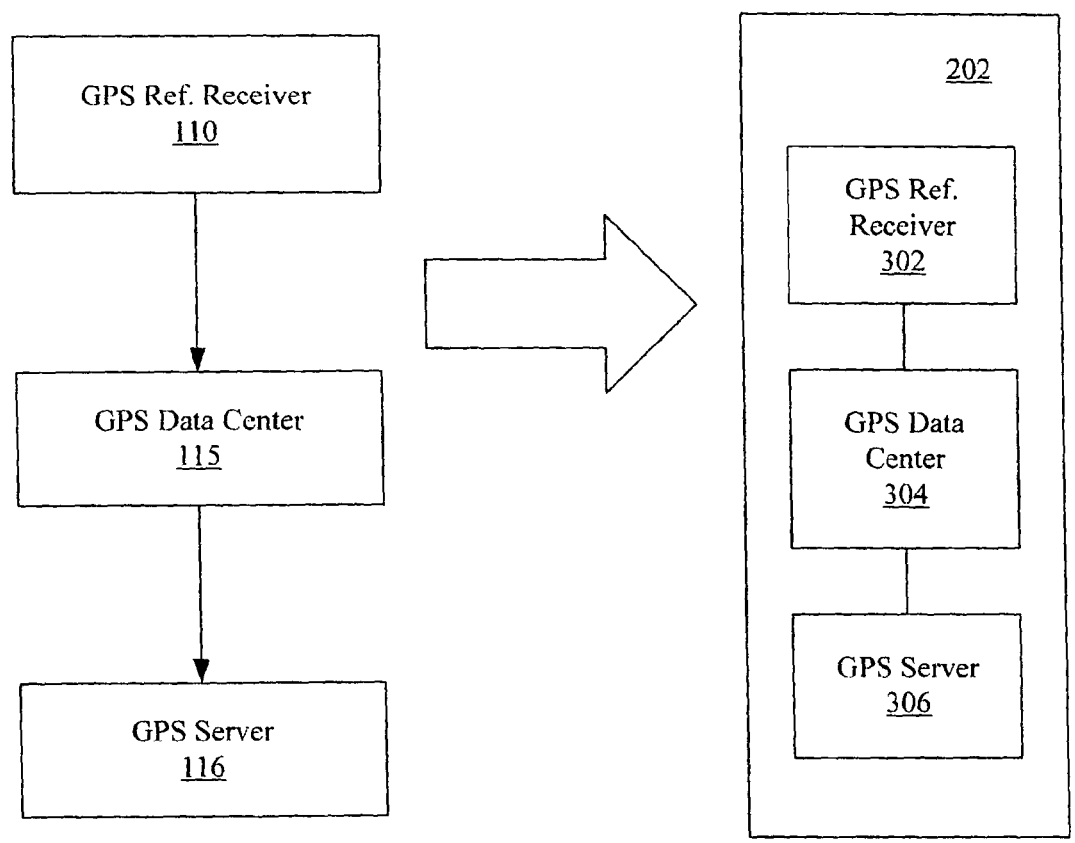
FIG. 3 is a block diagram inside of the GPS enabled Mobile Station of FIG. 2 having a virtual satellite system server implementing the functionality of the GPS reference receiver and GPS Data Center.

In FIG. 3, a block diagram inside of the GPS enabled Mobile Station 108, FIG. 2 having a virtual satellite system server 202 implementing the functionality of the GPS reference receiver 110, GPS Data Center 115 and GPS Server 116 is shown. The GPS client 112 has a virtual satellite system server 202 that is made up of an internal GPS reference receiver portion 302, a GPS Data Center portion 304 and a GPS server 306 that may be implemented in the Mobile Station 108. The virtual satellite system server 202 may be used as a GPS assistance data source (when navigating) or as a GPS assistance data user (when trying to acquire satellites). Thus, other Mobile Stations having virtual satellite system servers in a common geographic area (referred to as a neighborhood) may provide the GPS assistance data for a given Mobile Stations or the other Mobile Stations having virtual satellite system servers may request assistance when attempting to acquire satellites. The use of the virtual satellite system server 202 saves on the expense of implementing fixed real/physical GPS reference receivers throughout a network.

The Mobile Station 108 may operate in a network aided GPS mode, it may be powered "ON" long enough to collect the totality of all ephemeris and almanac data necessary to provide aiding. The "ON" time may be between 1-10 seconds, ephemeris data collection may require up to approximately 30 seconds and may not be possible if the Mobile Station is in a harsh environment. In other implementations, the aided GPS mode may be powered "ON" long enough to collect and transmit portions of the ephemeris and/or almanac data The Mobile Station 108 may collect only a fraction of the navigation data or messages (i.e. one word or one subframe at most), and the information may be combined with other pieces of data collected by other Mobile Stations. The positioning data is moved from Mobile Station to Mobile Station or device to device by use of a shuttle message that transports the partial data and is updated by the device that is in current possession of the shuttle message. Once the data is collected, it may be decoded in a Mobile Station or place where sufficient information is not directly available, and where enough information is in the shuttle message.

The positioning data being moved in the shuttle message may be at different levels of processing. The positioning data may be complete, current and valid set of positioning data that may be used for immediate satellite acquisition. The data may also be incomplete raw data at different levels of collection and verification and may pertain to future positioning data. This data may be collected in the background in the shuttle message and substituted to the complete current and validated set of positioning data. Thus, there is a simultaneous benefit from the shuttle message to accelerate the acquisition of GPS satellites while preparing future positioning data in parallel. In other embodiments, the shuttle message may only assemble and provide current, validated set of positioning data.

Figure 4:
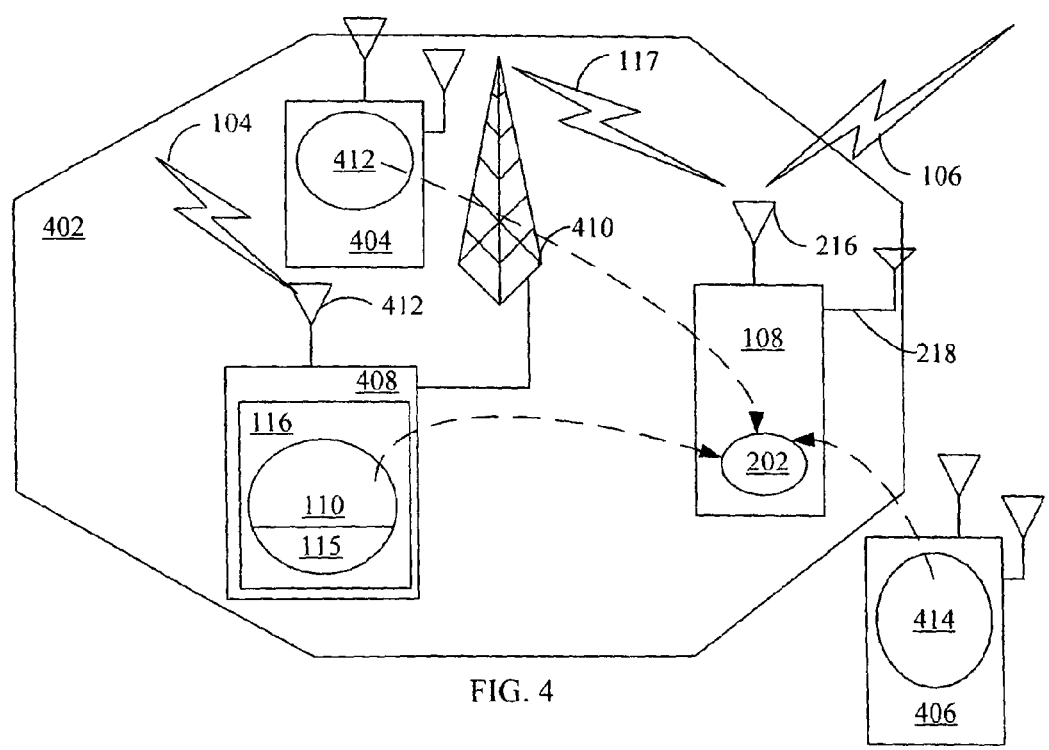
FIG. 4 illustrates the GPS enabled Mobile Station of FIG. 2 with a virtual satellite server within wireless network receiving information from other wireless devices.

In FIG. 4, the GPS enabled Mobile Station 108 of FIG. 1 with a virtual satellite server 202 within wireless network 402 receiving information from other mobile stations 404 and 406 is illustrated. The other mobile stations may be located within a wireless network, such as mobile station 404 or external to the wireless network 406 as long as communication is possible between mobile stations 108 and 406. Examples of such communication would be mobile stations 108 and 406 communicating using a Bluetooth network rather than the cellular network 402. The wireless network 402 has base station 408 that contain GPS server 116 with a co-located GPS reference receiver 110 and GPS Data Center 115 and is connected to antenna 410 and GPS antenna 412. The other wireless device 404 having a virtual satellite system server 412 is also within wireless network 402. The third device 406 outside of wireless network 402 and also contains a virtual satellite system server 414. The third device 406 may, be a Bluetooth enabled Wireless device that contains a virtual satellite system server 414.

The additional devices 404 and 406 may communicate with the GPS enabled Mobile Station 108 via the communication link 117 (or over a control channel) established within the network infrastructure of network 402 via base stations that connected with other networks such as the public switch telephone network and/or microwaves. Wireless device 406 is shown as being outside of the wireless network 402 while wireless device 404 is within wireless network 402. The wireless device 108, 406, and Mobile Station 404 are shown as wireless device, but in other implementations may be a wireless device, wired device or transportable wired/wireless device.

If the GPS enabled Mobile Station 108 is unable to determine its location from the GPS signal 110 and possesses a virtual satellite system server 202, such as the GPS reference receiver 302 and GPS Data Center 304 of FIG. 3, the GPS enabled Mobile Station 108, FIG. 4 may request aiding or assisting information from other satellite position system servers in other devices located in the network 402, such as the base station 408 via antenna 410, the wireless device 404, or other wireless device 406. A broadcast message may be sent over a control channel by the GPS enabled Mobile Station 108 that request aiding or assisting information from other devices and the other devices 408, 404 and 406 that have virtual satellite servers systems may then respond. In other embodiments, the responses may be sent over voice or data channels established between the GPS enabled Mobile Station 108 and the other devices 404, 406 and 408. Such communication is shown in FIG. 4 as dashed lines with arrows that terminate at the virtual satellite system server 202.

Figure 5:
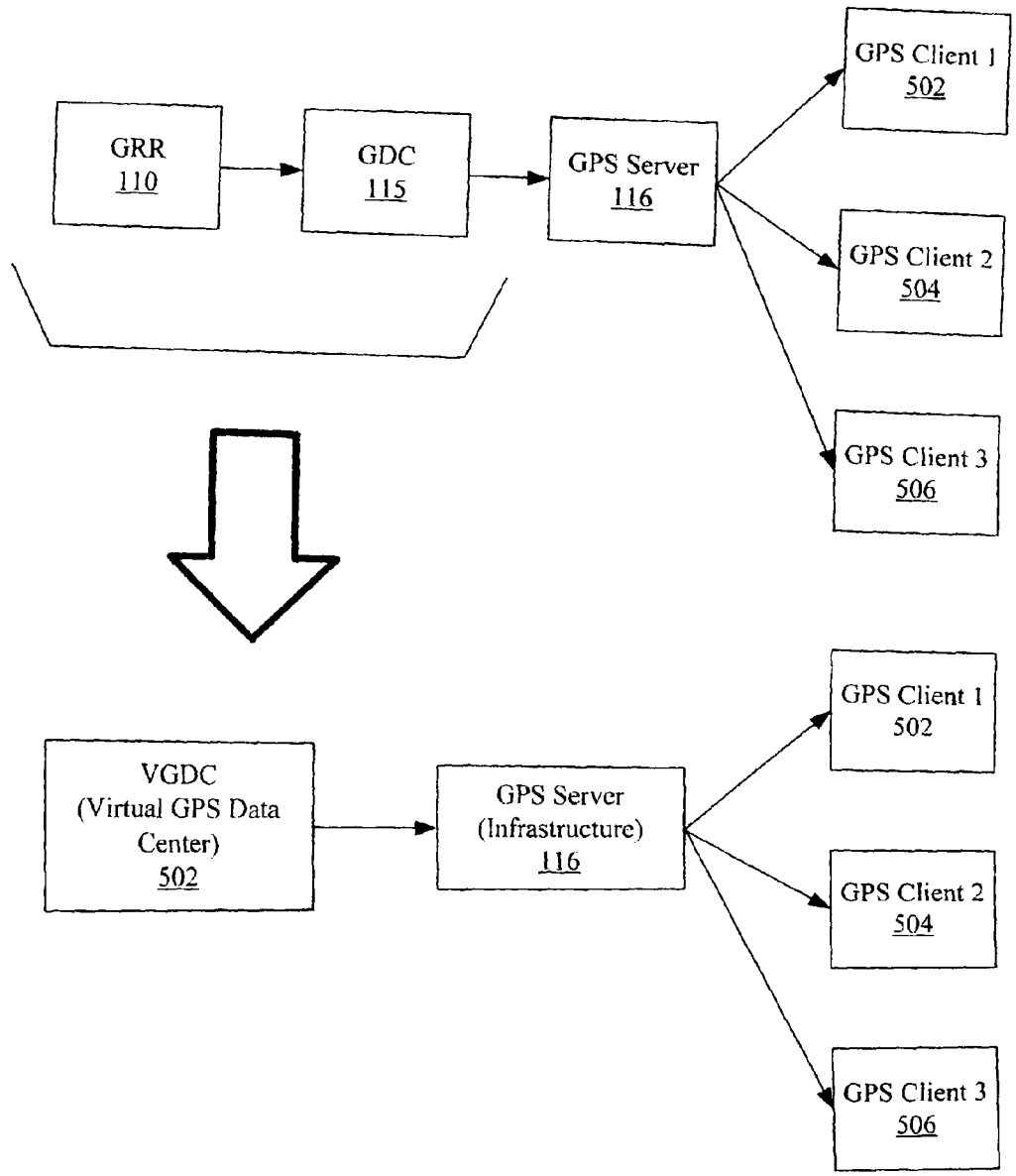
FIG. 5 is a block representation of networks elements being combined in a virtual satellite system server of FIG. 2.

Turning to FIG. 5, a block representation of networks elements 110 and 115 being combined in a virtual GPS Data Center (VGDC) 502. The VGDC 202 communicates with the GPS Server 116. The GPS Server 116 then communicates with GPS clients 502 and additional GPS clients 504 and 506 that may also be present in respective Mobile Stations (not shown). The GPS clients 502, 504, and 506 are able to communicate with a GPS server 116 in order to receive aiding or assisting information. Alternatively, the GPS clients 502, 504 and 506 may contain the functionality of a virtual GPS Data Center 508 this is a subset of the virtual satellite server system 202 in a wireless or handheld device GPS Data Center. The virtual GPS Data Center communicates with a GPS server 116 fixed as infrastructure within a network.

The VGDC 508 is able to determine an approximate location, acquire almanac data and ephemeris data and store that information in a virtual GPS Data Center 202. The information contained in the VGDC 508 may be exchanged with the GPS server 116. The information once acquired by the GPS server 116 is accessible from other GPS clients, such as GPS client 1 502. GPS client 2 504 and GPS client 3 506.

Figure 6:
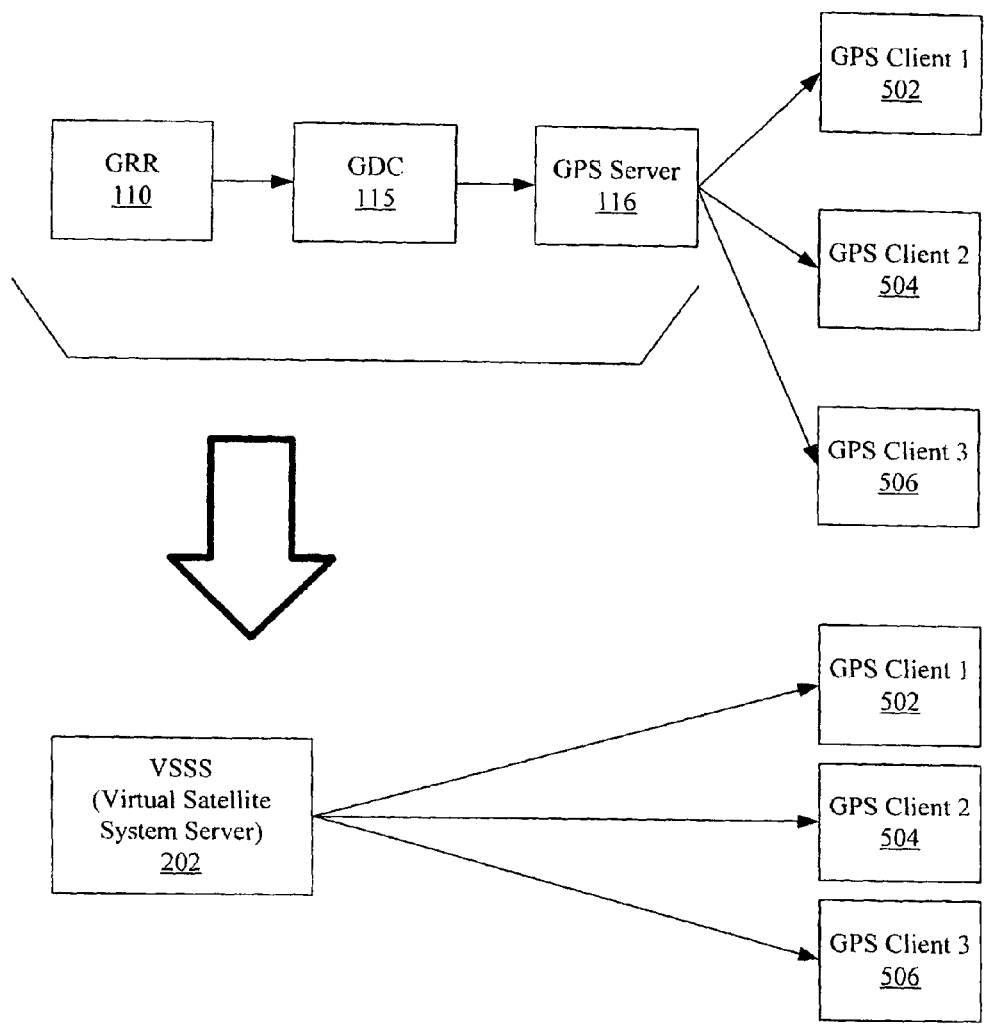

In FIG. 6, a block diagram illustrating the network elements 110, 115 and 116 that are implemented the VSSS 202 is shown. The network elements are shown communicating with GPS clients 502, 504 and 506 with a point-to-point connection. The VSSS combines the functionality of the GPS reference receiver 110, GPS Data Center 115 and the GPS server 116 in the VSSS 202. The combined functionality enables a wireless device, such as Mobile Station 108, to receive and store location data such as almanac data, ephemeris data and location data, in addition to being able to receive such data from other virtual satellite system servers that malt be either network based or wireless based. Thus point-to-point communication between virtual satellite systems servers may be established in order to transfer and share location data. Further, the virtual satellite system server 602 may provide aiding or assisting data to other GPS clients that are only able to request aiding or assisting information from virtual satellite system servers.

Figure 7:
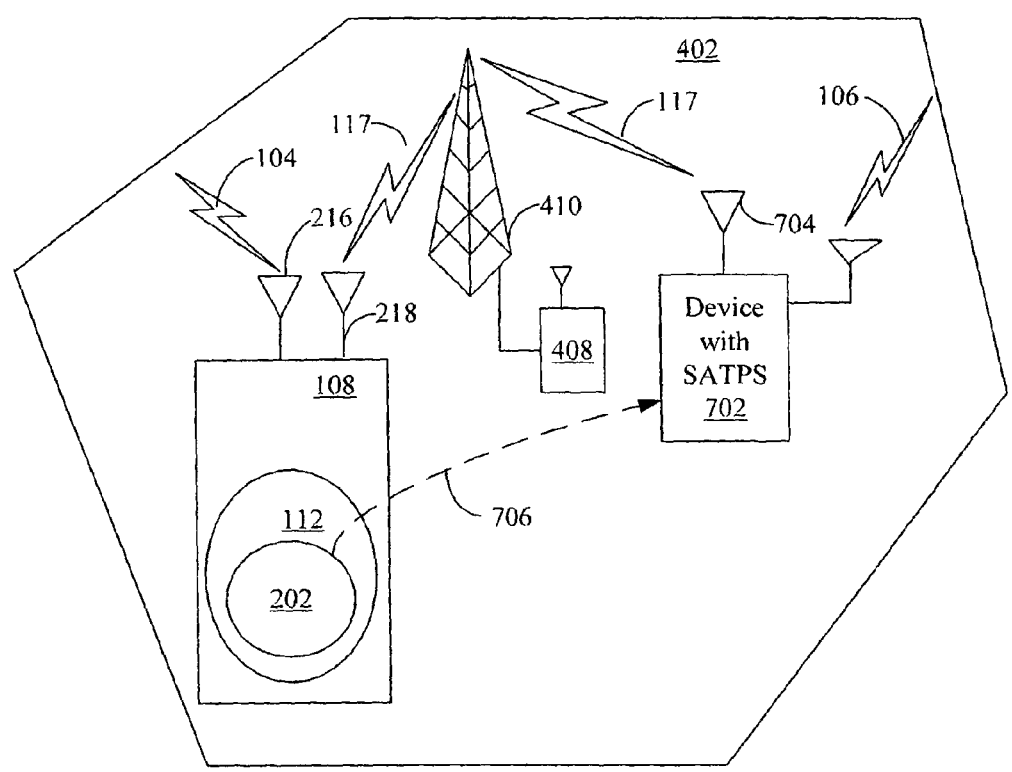
FIG. 7 is a GPS enabled device communicating with another GPS enabled device having a virtual satellite system server of FIG. 2 within a wireless network.

Turning to FIG. 7, a GPS enabled device 702 communicating with a GPS enabled device 108 having a virtual satellite system server 202 within a wireless network 402. The GPS enable device 702 has a satellite position system (SATPS) receiver connected to antenna 216. The GPS enabled device 108 with a virtual satellite system server 202 contained within the GPS client 112 is able to communicate 706 directly with the GPS enabled device 702 via the wireless network 402 using the infrastructure, i.e. base station 408 via antenna 218. The virtual satellite system server 202 in the GPS enabled Mobile Station 108 provides aiding and/or assisting data to other mobile stations. Depending on the virtual satellite system server 202, a GPS server may be implemented in the network or may be part of the virtual satellite system sender 202. The virtual position system sender 202 may reside in the GPS enabled client 112 or may reside in the call-processing unit 114 of a wireless device such as a cellular telephone. The GPS enabled client 112 having the virtual satellite system server 202 may or may not reside within the same wireless network as the requesting wireless device 702. The wireless network 402 may enable the transmission 117 of the aiding and/or assisting data. It may be accomplished either over a general control channel or in other embodiment over a connection oriented or connectionless session. In yet other wireless systems, the connection may be directly among multiple wireless devices on an IP bearer or via a network feature such as instant messaging.

The virtual satellite system server 202 may include the GPS receiver. GPS Data Center and GPS server to provide GPS satellite information for assisting or aiding other devices that are attempting to determiner their positions. The virtual satellite system server 202 may be in a network entity such as a base station 408 or other devices. The virtual satellite system server 202 may use the controller of the wireless device to execute a set of instructions that implement the virtual satellite system server 202 or may have a separate controller. The virtual satellite system server 202 may reside in GPS client in handheld PDAs, cellular telephones, and other wireless and non-wireless portable devices.

Figure 8:
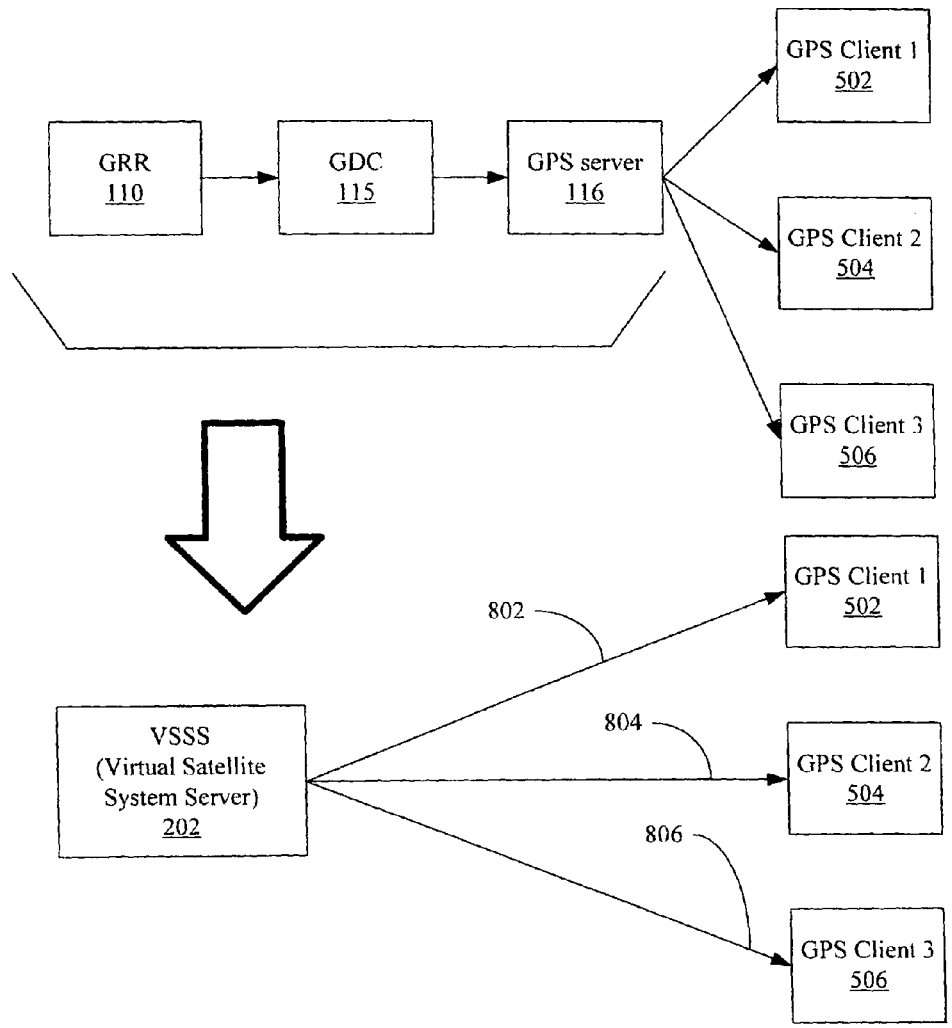
FIG. 8 is a block diagram of a virtual satellite system server of FIG. 6 communicating with a plurality of GPS clients.

Turning to FIG. 8, a block diagram of a virtual satellite system server 602 communicating with a plurality of GPS clients 502, 504, 506. In this implementation, the virtual satellite system server 602 combines the network functionality of the GPS reference receiver 110. GPS Data Center 115 and GPS server 116 within a GPS client, such as GPS client 112. FIG. 2. The GPS server 116 is able to communicate with multiple GPS clients 502, 504 and 506. Similarly the virtual satellite system server 602 may communicate 802, 804 and 806 with multiple GPS clients 502, 504 and 506 as opposed to point-to-point type communication depicted in FIG. 6.

Figure 9:
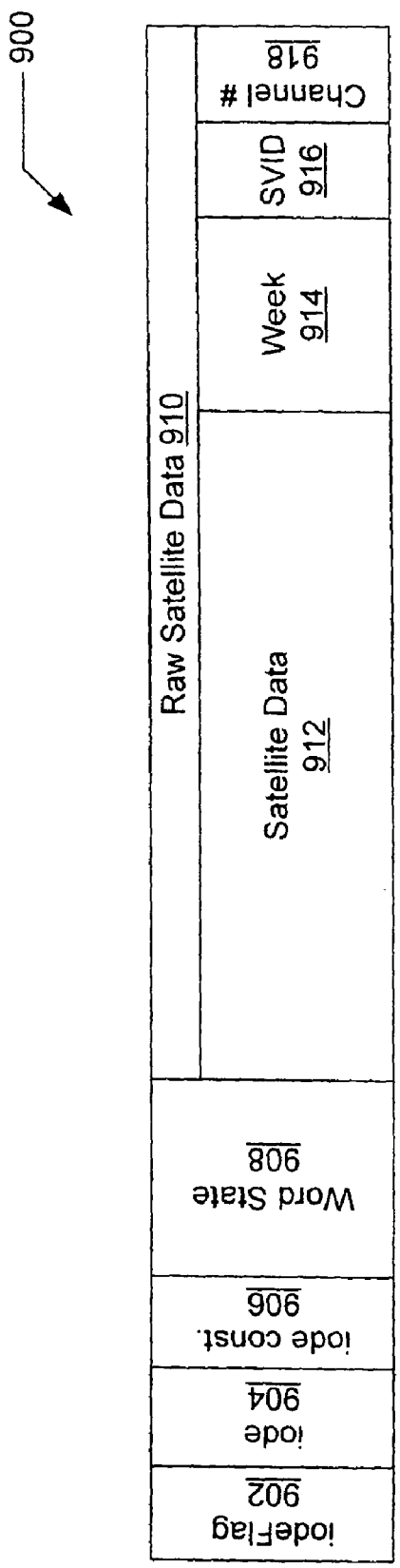
FIG. 9 is a diagram of a shuttle message 900

In FIG. 9, a diagram of a shuttle message 900 is shown. The shuttle message 900 may be passed between virtual satellite system server enabled devices such as Mobile Station 108 and non-virtual satellite system server devices that are only capable of receiving the shuttle messages 900. The shuttle message 900 may transport positioning data, such as raw satellite data. Each virtual satellite system server may be able to receive and transmit the shuttle message 900.

The shuttle message 900 malt have an issue of data ephemeris (iode) flag 902, Iode 904, Iode constant 906, and word state 908, along with the raw satellite data 910. The raw satellite data 910 mats have a satellite data portion 912, week since system went operational value 914, satellite vehicle identification 916, and channel number 918. The iode 904 is the issue of data ephemeris and the iode flag 902 identifies if the iode is valid or invalid. The word state 908 identifies when the iode is complete and the raw satellite data 910 is data that was originally transmitted by a GPS satellite. In other implementations, other types of satellite systems may have different types of raw satellite data associated with them that are different from the GPS system maintained by the United States.

The shuttle message 900 may be transported over a network by another protocol, i.e. encapsulated within another protocol or protocol message. In other implementations, a shuttle message 900 may, be defined in a protocol message. The virtual satellite system server in receipt of the shuttle message 900 may determine if additional information is available at that mobile station 108. If additional information is available then the missing data words or data bits are added to the shuttle message 900 depending upon the implementation. The updated shuttle message may be reformatted to include the new positioning data or regenerated with the original positioning data and the new positioning data.

The mobile station 108 in receipt of the shuttle message 900 may also use data contained in the shuttle message to complete or augment positioning data stored at the mobile station 108. In other implementations, additional data may also be passed in the shuttle message such as security data keys, software updates, and status information.

Figure 10:
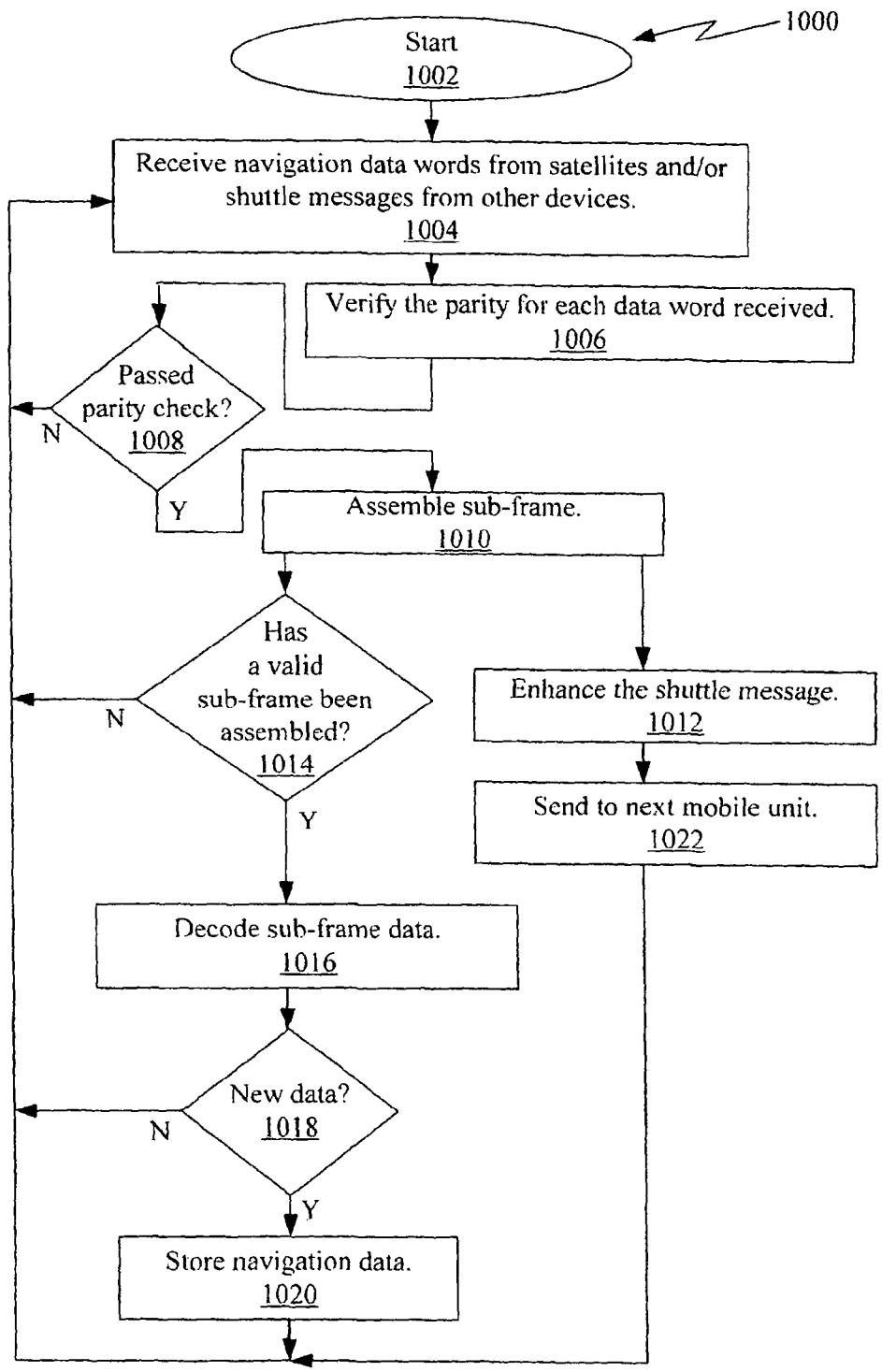
FIG. 10 illustrates a flow diagram of the operation of the mobile station of FIG. 2 with a virtual satellite system server in receipt of a shuttle message of FIG. 9 with data words.

Turning to FIG. 10, a flow diagram 1000 of the operation of the GPS enabled mobile station 108 of FIG. 2 with a virtual satellites system server 202 in receipt of a shuttle message 900 of FIG. 9 is shown. In the data word embodiment, the process starts 1002 with one or more data words (navigation data words) being received 1004 from a satellite (i.e. 102) or contained in a shuttle message 900 sent from another device. A parity check occurs 1006 on each data word. In other implementations, the parity check may occur on groupings or blocks of data. If the parity check passes 1008, then the sub-frame is assembled 1010 and the shuttle message 900 is enhanced with the sub-frame data 1012. Otherwise when the parity check fails 1008, new navigation data word or words are received 1004.

If the valid sub-frame is assembled 1014, then it is decoded based on its sub-frame number and page number 1016. Otherwise if a valid sub-frame has not been assembled in step 1014, then an additional word or words are processed 1004. The decoded sub-frame data is examined to determine if new data 1018 is present. If the decoded sub-frame data is not new data 1018 then another navigation data word or words are received 1004. If the data is new data 1018 then the new data (i.e. navigation data) is stored in a data structure in memory 1020 and another navigation data word or words are received 1004.

In step 1010 assembled sub-frames 1010 are used to enhance the shuttle message 1012. The enhanced shuttle message is then sent to another device (wireless device that may be mobile or fixed wired or wireless device). In another embodiment the other device may forward the shuttle message without processing the data or process the data contained in the shuttle message and only forward an enhanced shuttle message to yet other devices. One of the advantages of forwarding the shuttle message is the ability to extend the range of shuttle message beyond network boundaries by using devices as repeaters and transmitting the shuttle message over a protocol such as 802.11 or Bluetooth. Another advantage is the ability for devices to determine their location when acquisition of an adequate number of GPS satellites is impractical or impossible.

The positioning data consistency is maintained during sub-frame reassembly with words from different devices such as mobile station 108 PDAs, other wireless devices, or from the same device but at different times. For example, in sub-frame 1, 2 or 3 all words assembled into a sub-frame are of the same "iode" and sub-frame number. There are many possible implementations to ensure consistency of the assembled data, an example of a data structure for ephemeris data may be:

---

Subframe data Structure
    Typedef struct
    {
        UINT8         iodeFlag;
        UINT8         iode;
        UINT8         iode_consist;
        UINT16       wordState;
        RAW_SAT_DATA rawSatData;
    } SUBFRAMEDefs;
    static SUBFRAMEDefs
    g_subframe1Buff[NUM_OF_CHANNELS],
        g_subframe2Buff[NUM_OF_CHANNELS],
        g_subframe3Buff[NUM_OF_CHANNELS];
    the RAW_SAT_DATA is the same as used in holding the raw subframe data
    typedef struct
    {
        UINT32       data[10];
        UNIT16       week;
        UNIT8        svid;
        UNIT8        channelNum;
    }RAW_SAT_DATA

---

Each word of a sub-frame in the static data arrays may have two states: "not collected" state and "collected" state. When the sub-frame data structure is initialized or reset, the ten words may be initially set to the "not collected" state. When a word has been collected and passed the parity check, it is then set to the "collected" state.

The iode flag may have two values. "invalid" and "valid." When the data structure is initialized or reset, the flag maxi be initially set to "invalid." When the first valid iode is received, the flag may be set to "valid." With the changing of iode values, the data collection may be restarted again with initial conditions set. When the iode flag is set to "valid", the iode_consist may also be set to TRUE. After that if the same sub-frame data does not have a valid iode, the iode_consist may be set to FALSE until the next valid iode with the same value is received.

The procedures of data word or data words collection initially starts by initialization of the data word flag to zero (not collected state) and setting the iode flag to zero (invalid iode). If the second data word of the frame passed parity check, it is decoded and assigned to the static data array; it may also contain the time tag of the sub-frame. If the second data word failed to pass the parity check, the sub-frame number may be indirectly recovered by using the time tag of the sub-frame. All data words collected are associated with the same iode value. The data word collection starts when a first valid iode in the sub-frame is available. When a data word has been collected, its state is changed to "collected." When a new iode with a different value is received, all data word flags are reset to "not collected" and the data collection starts again.

When the iode flag is valid the iode_consist is TRUE and all data word flags of the data words that contain useful information for decoding ephemeris are in the "collected" state, the data collection is completed and the raw frame is read for further processing. When all three sub-frames (1, 2 and 3) have been collected and have the same iode, the ephemeris data may then be decoded. One skilled in the art would appreciate that other types of data structures and states may be employed in order to achieve significantly similar results.

Figure 11:
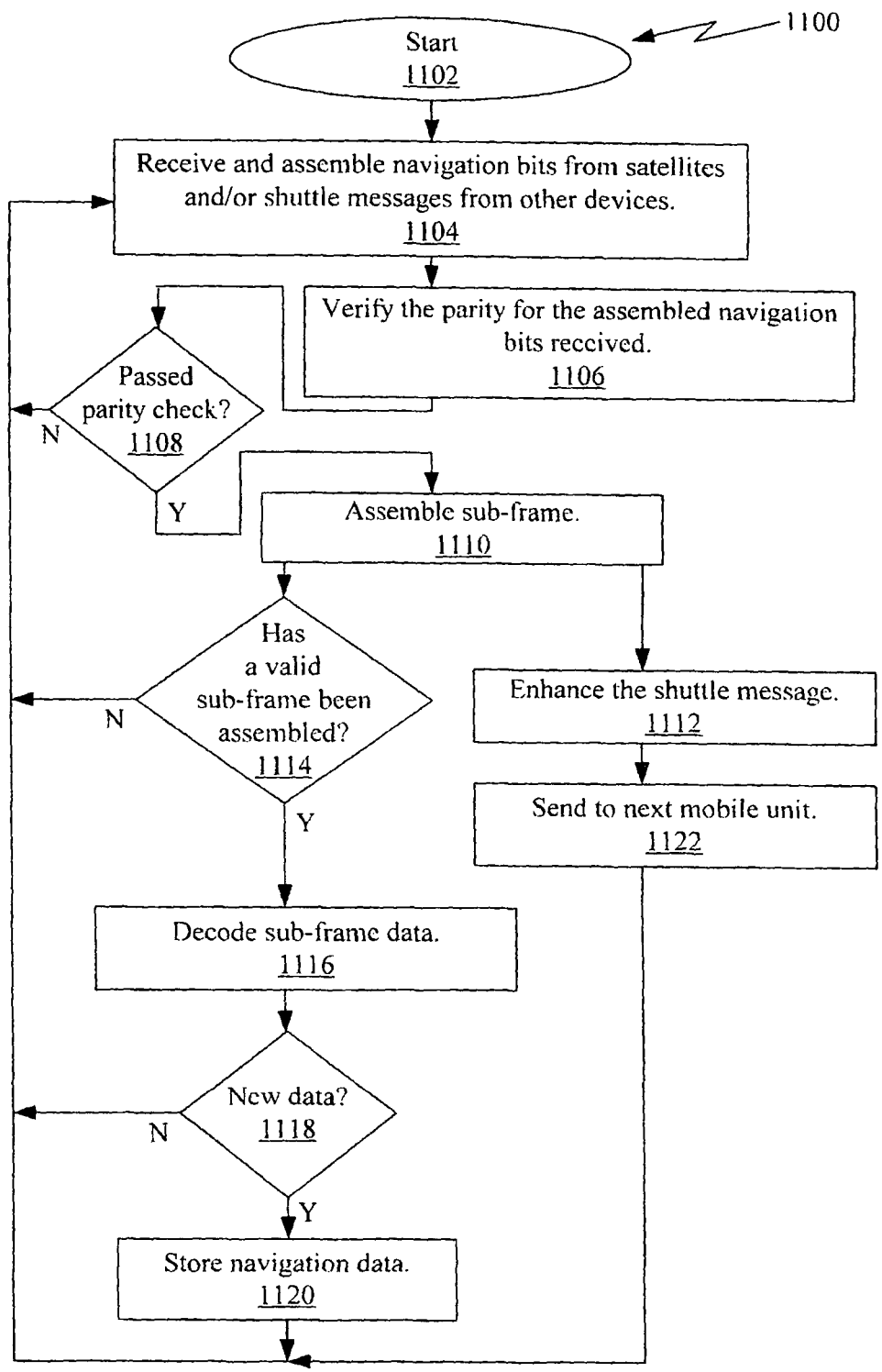
In FIG. 11 illustrates a flow diagram of the operation of the mobile station of FIG. 2 with a virtual satellite system server.

In FIG. 11, a flow diagram 1100 of the operation of the mobile station 108 of FIG. 2 with a virtual satellite system server 202 in receipt of a bit stream from a shuttle message of FIG. 9 is shown. In the bit stream embodiment, the process starts 1102 with data bits being received 1104 from a GPS satellite (i.e. 102) or from a shuttle message 900 sent from another device, such as mobile station 108. The format of an example bit stream may be 10 bits for GPS time of week at start of a sub-frame (range from 0 to 604800 seconds), 9 bits for the total number of bits in the stream (range 1 to 300), 9 bits for the position of the first bit in the sub-frame (range from 1 to 300), and the actual bit stream. To assemble a data word from a bit stream received at different receivers or collected at different times requires that the sub-frame number and the sequence number of the bits in the sub-frame be determined. A parity check occurs 1106 on assembled navigation bits. In other implementations, the parity check may occur on groupings or blocks of data. If the part check passes 1108, then the sub-frame is assembled 1110 and the shuttle message is enhanced with the sub-frame data 1112. Otherwise when the parity check fails 1008, new navigation data bits are received 1004. If the valid sub-frame is assembled 1114, then the sub-frame is decoded based on its sub-frame number and page number 1116. Otherwise if a valid sub-frame has not been assembled in step 1114, then additional bits are processed 1104. The decoded sub-frame data is examined to determine if it is new data 1118 that is present. If the data is not new data 1118, then additional navigation data bits are received 1104. If the data is new data 1118, then the new data (i.e. navigation data) may be stored in a data structure in memory 1120 and other navigation data bits are received 1104.

In step 1110, the sub-frames are assembled and then used to enhance the shuttle message 1112. The enhanced shuttle message is then sent to another device. In another embodiment, the other device may simply forward the shuttle message or process the shuttle message and forward it to yet other devices. One of the advantages of forwarding the shuttle message is to extend the range of shuttle message by using devices as repeaters and protocols such as 802.11 and Bluetooth.

Figure 12:
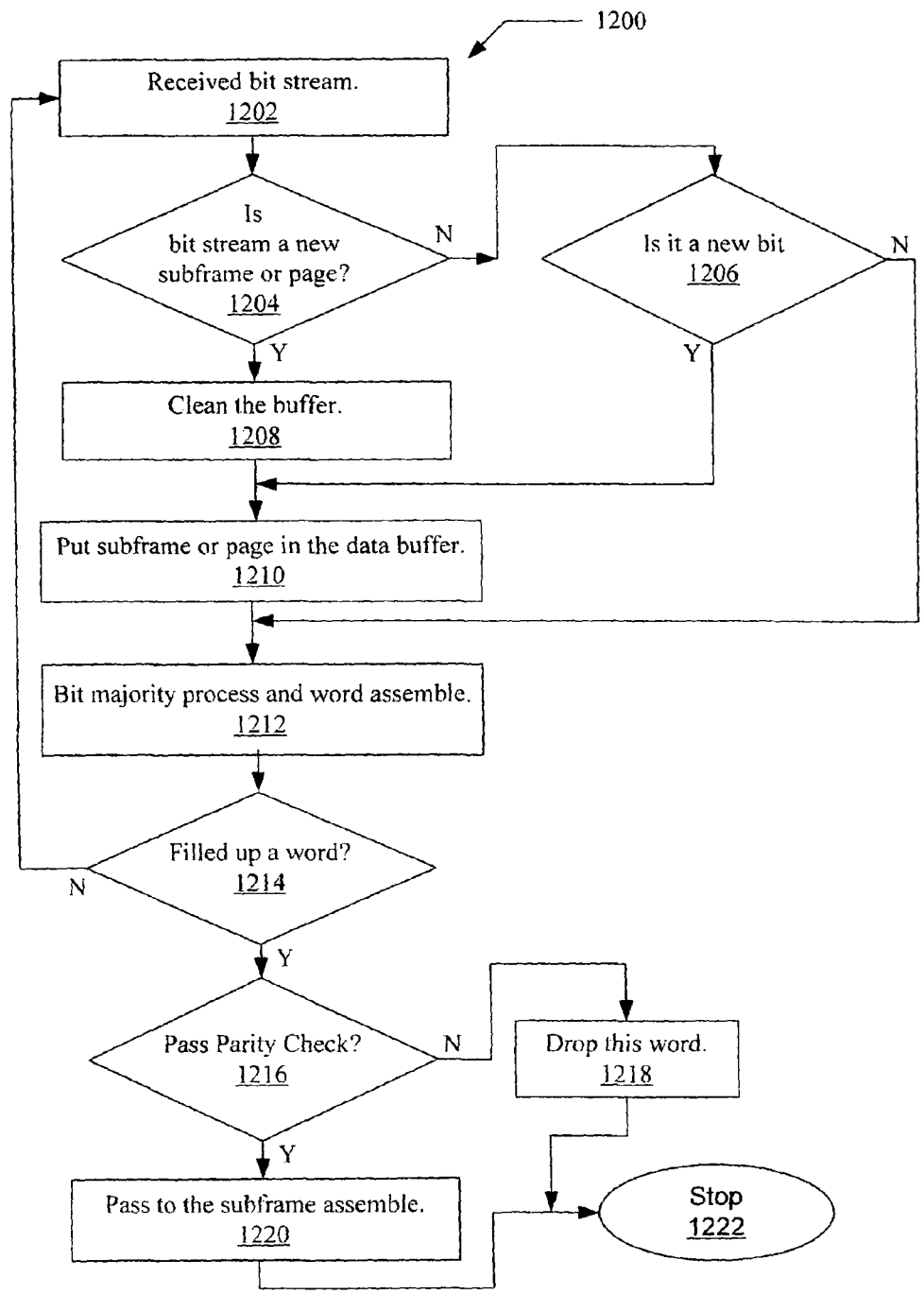
FIG. 12 illustrates a flow diagram of bit assemble procedure used by the virtual satellite system server of FIG. 2.

Turning to FIG. 12, a flow diagram of bit assemble procedure 1200 is shown. The procedure starts 1202 with data bits in the data bit stream being received at a device such as mobile station 108. A check occurs to determine if the received data bit stream is a new sub-frame or page 1204. If the data bit stream is not a new sub-frame or page 1204, then a check is made to determine if a new bit is present 1206. If the data bit stream is a new sub-frame or page 1204 then a buffer is cleared 1208 and the sub-frame or page is placed in the data buffer 1210. The bit majority process and word assemble 1212 then occurs. Similarly, if a new data bit is detected 1206, then the bit majority process and data word assemble occurs 1212.

In the bit majority and data word assembly 1212, the received data bits are assembled into data words. If a received data bit is different from the previous collected bit, the second data word will be formed. If the data bit is received for the same position again, a majority rule is applied to select the data bit to be kept. When thirty data bits that make up a data word have been collected 1214, the data words that have survived the majority selection are be passed to the parity check 1216. Otherwise if a data word is not filled 1214, then more data is processed from the data bit stream 1202.

If the filled data word does not pass the parity check 1216, then the data word is dropped 1218. Otherwise, the data word is passed to the sub-frame assemble block 1110 of FIG. 11. The process is shown as stopping 1222 after blocks 1218 and 1220, but in practice, processing may continue indefinitely.

Figure 13:
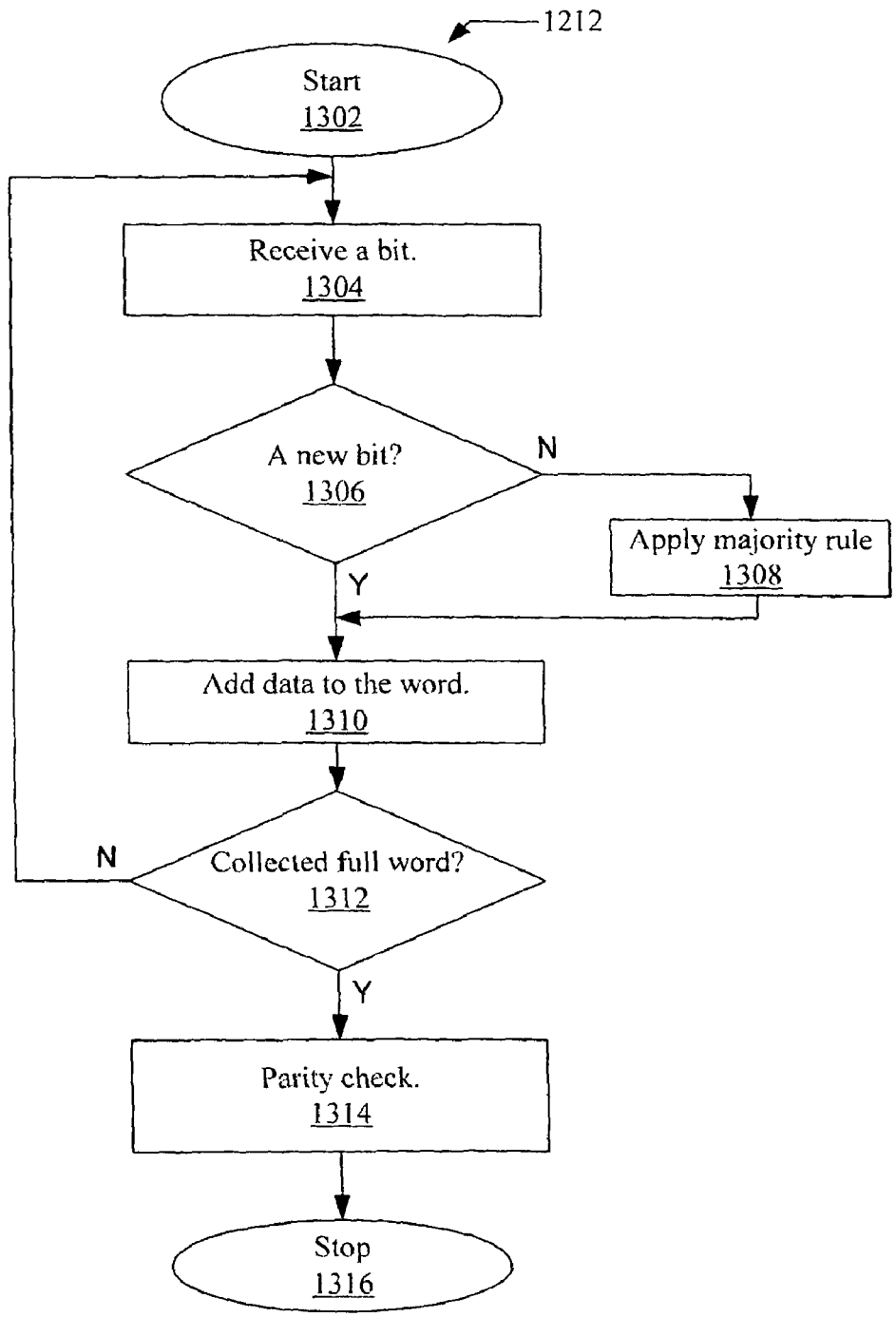
FIG. 13 illustrates a flow diagram of the bit majority process and word assemble block 1112 of FIG. 12.

In FIG. 13, a flow diagram of the bit majority process and data word assembly block 1212 of FIG. 12 is shown. The procedure starts 1302 with a data bit being received 1304. A check is made if it is a new data bit 1306. If the received data bit is a new data bit, then the data bit is added to the data word 1310. If the received data bit is not a new data bit 1306, then the majority rule 1308 is applied and the results are added to the data word 1310. Subsequently a determination is made if a full data word has been collected 1312. If a full data word has not been collected 1312, then more data is received 1304. Otherwise, a full data word has been collected 1312 and a parity check occurs 1314 and processing is complete 1316. Even though processing is complete and showed as stopping 1316, in practice the process may continuously execute.

In some applications, there may be more than one RF signal, such as GPS/GSM mobile units. To reduce the interference between the RF signals, the signals are multiplexed for time-sharing. For example the GPS signal reception mats be turned off for "x" milliseconds while the GSM signal reception or transmission is on, and then the GSM signal reception or transmission turns off for "y" ms while GPS signal reception is on. The value of "x" and "y" is chosen so that the tracking loop can still maintain tracking of the signal without loss of signal lock. But, the data bit malt be deteriorated and the bit error rate (BER) may increase during the time the GPS reception is turned off.

Since the ephemeris data retransmit in 30 seconds interval it is better to choose the multiplexing interval that is the least common multiple of x+5; and the ephemeris data-repeating period 30 seconds. For example, the values for "x" and "y" may be x=15 ms and y=30 ms. This ensures the data bit detection energy will not be the same as the previous one of the same data bit. For example, x+y=45 ms, the least common multiple is 90 seconds. To reduce the BER the "x" (signal off period) should be less than the 20 ms (data bit period) to avoid blocking out a whole bit. The "energy weight majority rule" mall be applied to reassemble the bit together with the parity, check. When the same data bit is received from a different receiver, each of the data bits are weighed with its "on period" range from 0% to 100%. There is a threshold to distinguish the majority. If the threshold cannot be passed, more data bits need to be collected. If only one data bit in a data word is not received, the parity check mall recover that bit.

The energy weighted majority method can be expressed mathematically. Assume the "on period" of a data bit is "x" ms then the energy weight for it is E=x/20. Let E0i be the energy weight for the "i" th bit of 0 and E1i be the energy weight for the "i" th bit of 1. Assuming there are N bit of 0 value and M bits of 1 the average energy weight for 0 is;

$$W0 = \frac{1}{N}\sum_{i=0}^{N} E0i$$

and the average energy weight for 1 is;

$$W1 = \frac{1}{M}\sum_{i=0}^{M} E0i$$

The criteria of the energy weight majority, rule is;
W0−W1>T, then bit value=0.
W1−W0>T, then bit value=1.

Where "T" is the threshold and can be determined by, experiment and integrity level of the application system. The trade off between the availability and BER need to be made depending on the system design requirements. The approach may also be applied when collecting data bits for more than one data period. e.g. 30 seconds. It also may be applied for multi-receiver and multiple data period approaches.

The satellite data can be convolutional encoded with Forward Error Correction (FEC) code to increase its data bit integrity, such as WAAS and planned GPS L2c and L5. The encoded data, called symbols, is transmitted and may be decoded by a Viterbi decoder. In the case of the WAAS, the constrain length of the convolutional encoder is 7 and the rate is ½, which implies one data bit will produce two symbols. The maximum free distance attainable for the symbols With constrain length of 7 is 10. Thus, up to four symbol errors may be corrected for a reasonable length of data bits, such as 5 times the constrain length, which is 35 bits resulting in a preferred trellis path of 32 bits.

The leading edge of the first symbol of the current message is synchronous with a one second epoch of the WAAS Network Time (WNT) that is within 50 ns of GPS time. There are two approaches to perform data bit download and reassemble. One is with each mobile unit decode the received symbols and added the data bits to the shuttle message. The Mobile Station 104 will assemble the data bits from its own decoded data and the data bits from the shuttle message the same way as described previously. If the GPS server 112 or virtual satellite system server 202 is used to process the data bits it will assemble all data bits from the Mobile Station 108 and other mobile stations or devices.

The second approach is that the mobile station 108 directly sends the symbols instead of decoding it before assembling and decoding. Compared with the first approach, this approach requires fewer symbols to be continually collected by one mobile unit, but the size of the shuttle message will be doubled. The mobile station 108 or other device needs to identify the start symbol of the one-second data block and time tag.

Figure 14:
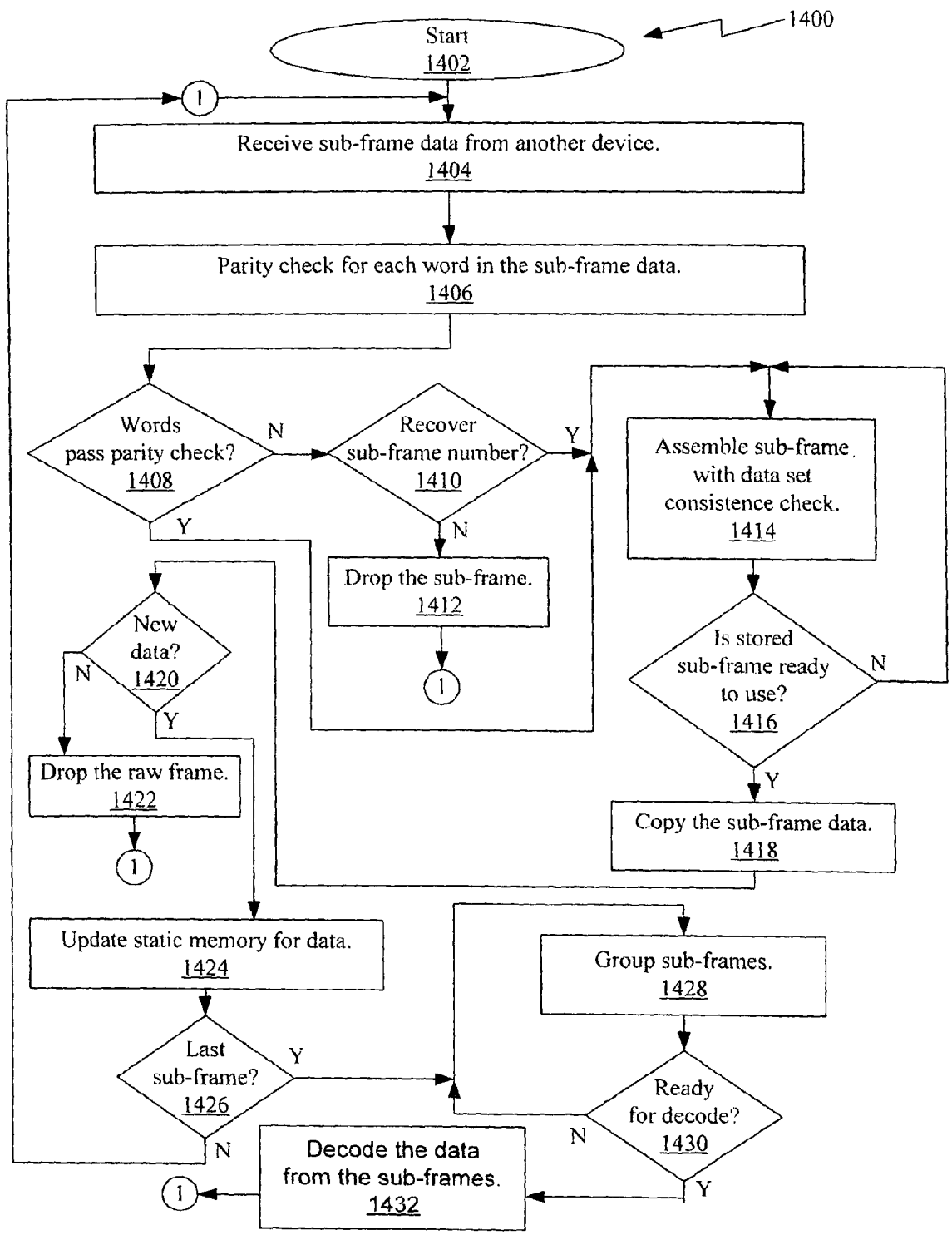
FIG. 14 illustrates a flow diagram of sub-frame data assembly within a mobile of FIG. 2.

Turning to FIG. 14, a flow diagram of sub-frame data assembly 1400 within a GPS enabled mobile station 108 of FIG. 2 is shown. The procedure starts 1402 with sub-frame data being received from another device 1404. Each data word in the received sub-frame has its parity checked 1406. If the data word or data words pass the parity check 1408, then a determination is made as to whether the data is new data 1420. Otherwise if the data word or data words have not passed the parity check 1408, then an attempt is made to recover the sub-frame number 1410. If the sub-frame number is unrecoverable in step 1410, then the sub-frame is dropped 1412 and another sub-frame is received 1404.

If the sub-frame passed the parity check 1408 or the sub-frame number is recovered 1410 then the sub-frame is assembled with a data set and a consistence check is executed to verify the consistence of the data set 1414. If the sub-frame is read) to be used i.e. processed) 1416, then the sub-frame data is retrieved 1418. Otherwise the sub-frame is again assembled with the additional data sets 1414. The sub-frame data is checked to determine if it is new data 1420. If the sub-frame data is not new data then the raw frame is dropped 1422 and another sub-frame is processed 1404.

If the data from the sub-frame is new 1420, then a data structure in static memory is updated with the data 1424. If the data is from the last sub-frame 1426, then sub-frames are grouped together with other data from sub-frames 1428. The grouped data is checked to determine if it is read) for decoding 1430. If the data from the sub-frames is reader for decoding then the data is decoded 1432 and processing of sub-frame data may continue 1404. Otherwise if the data is not ready for decoding, the grouping of data continues 1428. Furthermore if the sub-frame is not the last sub-frame 1426, then another sub-frame is received and processed 1404. The process is shown as being continuous, in other implementations the process may have a predetermined end.

The steps of the procedures shown if FIGS. 10, 11, 12, 13, and 14 is shown as occurring sequentially in alternate implementation some of the steps mats occur simultaneously. Furthermore, additional or combined steps may occur in other implementations. The steps of the procedure may be implemented in hardware, software, or a combination of hardware and software.

Parts of this implementation may be implemented in hardware, software, or a combination of hardware and software. Aspects of the present invention may be implemented as instructions in memory one skilled in the art will appreciate that all or part of systems and methods consistent with the present invention may be stored on or read from other machine-readable media, for example, secondary, storage devices such as hard disks, floppy, disks, and CD-ROMs; a signal received from a network; or other forms of ROM or RAM either currently known or later developed.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation malt vary between systems. The claims and their equivalents define the scope of the invention.

What is claimed is:

1. A GPS client device having a receiver and a transmitter, comprising:
   a controller;
   a memory coupled to the controller; and
   wherein the receiver is configured to receive from a first other GPS client device, a shuttle message that contains first incomplete partial positioning data including N bits of positioning data of a satellite, the controller is configured to combine the first incomplete partial positioning data with second incomplete partial positioning data including an additional M bits of the positioning data of the satellite stored in the memory to compute a location of the GPS client device, the controller is configured to insert the second incomplete partial positioning data stored in the memory into the shuttle message to provide an updated shuttle message, and the transmitter is configured to transmit the updated shuttle message to a second other GPS client device where N and M are integers greater than zero.

2. The GPS client device of claim 1, where the received partial positioning data is compared to the partial positioning data stored in the memory in order to determine if the partial positioning data is new.

3. The GPS client device of claim 2 wherein the shuttle message is formatted by the controller and includes the partial positioning data that is new.

4. The GPS client device of claim 2, where the partial positioning data that is new is a multiple of a data word.

5. The GPS client device of claim 2, where the portion of the positioning data that is new is a multiple of a bit.

6. The GPS client device of claim 1, where the positioning data is at least one type of data selected from almanac, ephemeris, GPS time, DGPS data, GPS/UTC time difference, ionospheric correction.

7. The GPS client device of claim 1, where the receiver receives the partial positioning data during a predetermined period.

8. The GPS client device of claim 7, where the receiver further includes:
a switch that enables the receiver to switch between reception of a GPS signal and another communication signal.

9. A method of position determination at a GPS client device, comprising:
receiving at a receiver, a shuttle message from a first other GPS client device containing first incomplete partial positioning data including N bits of positioning data of a satellite;
determining whether said first incomplete partial positioning data is new to the GPS client device;
combining the first incomplete partial positioning data that is new to the GPS client device with stored incomplete partial positioning data including an additional M bits of the positioning data of the satellite to compute a location of the GPS client device;
inserting the stored incomplete partial positioning data into the shuttle message to provide an updated shuttle message where N and M are integers greater than zero;
transmitting the updated shuttle message to a second other GPS client device.

10. The method of claim 9, comprising:
identifying positioning data at the GPS client device that is not contained in the partial positioning data contained in the message; and
formatting the shuttle message that includes the partial positioning data and the positioning data not already contained in the shuttle message.

11. The method of claim 10, where formatting further includes:
generating a new shuttle message that includes the partial positioning data and the positioning data not already contained in the shuttle message.

12. The method of position determination of claim 10, including:
receiving a further shuttle message that contains further partial positioning data;
comparing the further partial positioning data with positioning data previously acquired; and
storing the further partial positioning data that is new in the GPS client device.

13. The method of position determination of claim 9, including:
identifying data words within the partial positioning data.

14. The method of position determination of claim 9, including:
extracting a data stream from the partial positioning data; and
processing a plurality of bits from the data stream.

15. The method of position determination of claim 9, where receiving further includes:
receiving the shuttle message during predetermined periods.

16. The method of position determination of claim 15, further includes:
switching the receiver between reception of a communication protocol and reception of a GPS signal.

17. A non-transitory computer readable medium encoded with a computer program for position determination of a GPS client device, comprising:
a first plurality of machine-readable instructions which cause a receiver in the GPS client device to receive, from a first other GPS client device, a shuttle message containing first incomplete partial positioning data including N bits of positioning data of a satellite;
a second plurality of machine-readable instructions which cause the GPS client device to determine if the first incomplete partial positioning data is new to the GPS client device;
a third plurality of machine-readable instructions which cause the GPS client device to combine the first incomplete partial positioning data that is new at the GPS client device with stored incomplete partial positioning data including an additional M bits of the positioning data of the satellite to compute a location of the GPS client device;
a fourth plurality of machine-readable instructions which cause the GPS client device to add the stored incomplete partial positioning data to the shuttle message to provide an updated shuttle message; and
a fifth plurality of machine-readable instructions which cause a transmitter in the GPS client device to transmit, the updated shuttle message to a second other GPS client device where N and M are integers greater than zero.

18. The tangible computer readable media of claim 17, wherein the fourth plurality of instructions includes:
a sixth plurality of machine-readable instructions which cause the GPS client device to identify positioning data at the GPS client device which is not contained in the partial positioning data contained in the message;
a seventh plurality of machine-readable instructions which cause the GPS client device to format the shuttle message that includes the partial positioning data and the positioning data not already contained in the shuttle message.

19. The tangible computer readable media of claim 17, includes:
a sixth plurality of machine readable instructions which cause the GPS client device to compare the partial positioning data with positioning data contained in the virtual satellite system server; and
a seventh plurality of machine readable instructions which cause the GPS client device to store the partial positioning data that is new in the GPS client device.

20. The tangible computer readable media of claim 17, includes:
a sixth set of machine readable instructions which cause the GPS client device to identify a data word within the partial positioning data.

21. The tangible computer readable media of claim 17, includes:
a sixth set of machine readable instructions which cause the GPS client device to extract a data stream from the partial positioning data; and a seventh set of machine readable instructions which cause the GPS client device to process a plurality of bits from the data stream.

22. The tangible computer readable media of claim 17 where the first set of machine readable instructions for receiving further includes:
a sixth set of instructions which cause the receiver to receive the shuttle message during predetermined periods.

23. The tangible computer readable media of claim 22, further includes:
a seventh set of instructions which cause the GPS client device to switch the receiver between reception of a communication protocol and reception of a GPS signal.

24. A data structure maintained in a tangible memory of a GPS client device, comprising:
an iode field;
an iode flag field; and
raw satellite data field having a satellite data field including a plurality of incomplete partial positioning data successively inserted to the data field by the GPS client device and a plurality of other GPS client devices, each incomplete partial positioning data including a respective integer number of bits of positioning data of a satellite,
wherein a location of the GPS client device is computed based on the positioning data in the raw satellite data field.

25. The data structure of claim 24, where the raw satellite data filed further includes:
a data field;
a week field;
a satellite vehicle identification field; and
a channel number field.

* * * * *

UNITED STATES PATENT AND TRADEMARK OFFICE
CERTIFICATE OF CORRECTION

PATENT NO. : 8,244,271 B2
APPLICATION NO. : 10/969157
DATED : August 14, 2012
INVENTOR(S) : Ashutosh Pande et al.

It is certified that error appears in the above-identified patent and that said Letters Patent is hereby corrected as shown below:

Column 5, line 19, after the word "mobile", please insert --station--.

Column 6, line 45, "malt" should be --may--.

Column 7, line 38, "con unction" should be --conjunction--.

Column 10, line 2, "malt" should be --may--.

Column 11, line 1, "malt" should be --may--.

Column 11, line 2, "lode 904" should be --iode 904--.

Column 11, line 2, "lode constant" should be --iode constant--.

Column 12, line 36, "arrays" should be --array--.

Column 12, line 43, "maxi" should be --may--.

Column 13, line 26, "part" should be --parity--.

Column 13, line 61, "assemble" should be --assembly--.

Column 14, line 29, "mats" should be --may--.

Column 14, line 35, "malt" should be --may--.

Column 14, line 40, "x+5" should be --x+y--.

Column 15, line 25, "With" should be --with--.

Column 15, line 65, "read)" should be --ready--.

Column 16, line 8, "read)" should be --ready--.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,244,271 B2

Column 16, line 19, "mats" should be --may--.

Column 16, line 44, "malt" should be --may--.